United States Patent [19]

Fahey

[11] 4,397,913
[45] Aug. 9, 1983

[54] STARCH-CONTAINING TREATING COMPOSITION FOR GLASS FIBERS AND TREATED GLASS FIBERS AND STRANDS

[75] Inventor: Dennis M. Fahey, Lexington, N.C.

[73] Assignee: PPG Industries, Inc., Pittsburgh, Pa.

[21] Appl. No.: 206,420

[22] Filed: Nov. 13, 1980

[51] Int. Cl.³ .................. C03C 25/02; C08L 3/02; D02G 3/18

[52] U.S. Cl. .................. 428/369; 57/246; 57/249; 57/295; 65/3.1; 106/211; 106/212; 428/375; 428/391; 428/392; 428/396

[58] Field of Search ............... 106/212, 211; 428/375, 428/369, 391, 392, 396; 57/295, 350, 333, 246, 249; 65/3.1; 28/271

[56] References Cited

U.S. PATENT DOCUMENTS

| | | | |
|---|---|---|---|
| 3,227,192 | 1/1966 | Griffiths | 139/420 |
| 3,461,090 | 8/1969 | Haynes et al. | 260/17.4 |
| 3,615,311 | 10/1971 | Ignatius | 65/3 |
| 3,664,855 | 5/1972 | Morrison et al. | 106/212 |
| 3,672,947 | 6/1972 | Luscher et al. | 117/104 |
| 3,730,137 | 5/1973 | Luscher et al. | 118/325 |
| 3,869,308 | 3/1975 | Graham | 117/126 |
| 3,876,467 | 4/1975 | McCombs et al. | 127/71 |
| 3,887,389 | 6/1975 | Hedden | 106/212 |
| 3,887,752 | 6/1975 | Elizer | 428/378 |
| 3,928,666 | 12/1975 | Morrison et al. | 428/378 |
| 3,932,193 | 1/1976 | Graham | 106/211 |
| 3,946,132 | 3/1976 | Hedden | 428/378 |
| 3,971,871 | 7/1976 | Haynes et al. | 428/392 |
| 4,002,445 | 1/1977 | Graham | 65/3 |
| 4,003,111 | 1/1977 | Drummond | 28/72.11 |
| 4,066,106 | 1/1978 | Graham | 139/420 |
| 4,093,775 | 6/1978 | Szur | 428/394 |
| 4,137,209 | 1/1979 | Wong et al. | 260/29.6 |
| 4,164,485 | 8/1979 | Girgis | 260/5 |
| 4,166,872 | 9/1979 | Karpik et al. | 428/35 |
| 4,193,880 | 3/1980 | Marshall | 252/8.8 |

OTHER PUBLICATIONS

Page 285 from McCutcheon's "Detergents and Emulsifiers", North American Edition, 1978.
"Zonyl" Fluorosurfactants Brochure from DuPont.
Physical Property Sheet on TRITON OS-15 Surface Active Agent.
Physical Data Sheet on Polyox Water Soluable Resins.

Primary Examiner—James C. Cannon
Attorney, Agent, or Firm—Kenneth J. Stachel

[57] ABSTRACT

An aqueous sizing composition for treating glass fibers, the treated glass fiber strands and bulked yarn prepared from the treated glass fiber strands are provided to give treated glass fiber strands having an improved processability and characteristics in yarn bulking operations. The aqueous sizing composition has a modified starch that has Brabender values of gel temperature in the range of about 65° C. to about 90° C. with values maximum viscosity in the range of about 500 B.U. to about 1200 B.U. for a 9.5 dry percent concentration or equivalent. The aqueous sizing composition also has nonionic lubricants, wax, emulsifiers, starch plasticizer, and ester-modified amino silane coupling agent and possibly a biocide and or fungicide and cationic lubricant for treating glass fibers. The aqueous sizing composition can also be used to treat glass fibers of fine diameter, where the aqueous sizing composition has the aforedescribed ingredients including a poly (ethylene oxide) friction reducing agent, cationic amphoteric or nonionic wetting agent, and a fluorochemical surfactant.

27 Claims, No Drawings

STARCH-CONTAINING TREATING COMPOSITION FOR GLASS FIBERS AND TREATED GLASS FIBERS AND STRANDS

The present invention is directed to an aqueous starch-containing treating composition for treating glass fibers during their formation to produce treated glass fibers and strands having good processability even when processed into bulked yarn and improved, smooth payout from strand-containing packages including forming packages and bobbins.

The present invention is particularly directed to aqueous starch-containing treating or sizing compositions for treating glass fibers during their formation to produce sized glass fibers and strands and yarn having good characteristics for being texturized or fluffed up or bulked and having good tensile strength when bulked, texturized and/or fluffed and in addition having good processability including faster speeds of processing through the bulking operation and good payout from packages into the bulking operation.

Glass fibers produced from molten streams of glass from small orifices in a bushing in a melting furnace are treated with a chemical treatment and then combined in one way or another to produce glass fiber strands. Glass fiber strands made for use in the textile industry may be further processed by twisting, plying, braiding, and weaving operations. Glass fiber strand or strands may be formed into yarn by twisting the glass fiber strand or strands. The basic yarn has a single strand that is twisted, and plied yarns have several strands that are twisted together simultaneously.

In addition to standard type glass fiber yarns, the production of glass fiber yarns for the textile industry has included the production of bulked glass fiber yarns. These bulked glass fiber yarns can be produced in single and/or multiple and varieties and include such yarns as texturized yarns, and slubby type yarns. Generally the bulked, texturized, or slubby yarns consist of glass fiber strand or strands that have been subjected to considerable agitation as a yarn to disturb the filaments within the strands to reduce the adherence between the filaments. These bulky yarns may have a linear core portion with surface, closed, or crunodal loops of various size and distribution depending upon the extent of the disturbance of the filaments in the yarn. The bulky yarns also may lack a definitive linear core and they may appear as strand or strands with overlapping and/or intermingling filaments with surface, closed, or crunodal loops. The bulked yarns may appear to have uniform areas of bulkiness, or they may have intermittent areas of increased bulkiness or numbers of closed loops or texturizing. Typically the basic yarn and plied yarns are produced from twisted glass fiber strand or strands contained on bobbins, but the bulked yarns can also be produced from the forming packages of glass fiber strand or strands wherein the bulking process may impart a temporary or false twist to the strand or strands.

An example of such a bulking process is fluid-pressure texturizing where the filaments or strands are fed into a rapidly moving fluid, usually air, stream at the necked region of a nozzle. The feeding of the strands to an air jet can be in such a manner that the relative rate at which the strands or yarn are fed to the air jet that provides an area of fluid turbulence is faster than the relative rate of withdrawal from the jet. These relative rates can be varied along with the fluid or air pressure of the jet to produce varying degrees of bulking of the yarn. Downstream from the entry of the filaments or strands into the nozzle the channel widens which causes a turbulent air flow resulting in loops and entanglements of the filaments and strands. Other bulking processes include edge crimping and gear crimping, although the industry prefers the use of air jets because they are less damaging to the strands. The bulked yarn can be used in knitting, weaving, braiding, or pleating operations.

An especially interesting utility of bulked glass fiber strand yarn is its use as a replacement for asbestos without the concomitant hazards of asbestos. Such a glass fiber yarn product is available from PPG Industries, Inc. under the trademark of TEXO yarn. The yarn can be made into such products as thick fabrics, lagging fabrics, welding curtins, safety blankets, stress relieving blankets, tapes, braids, ropes, cords, wicks, bulk fillers, filtration cartridges, thermal insulation, packing and gaskets, and plastic laminates.

In forming treated glass fiber strands to be produced into bulked yarns it is typical to place a starch-oil chemical treatment on the fibers during their formation. The chemical treatment must protect the glass fibers from interfilament abrasion during further processing and in the bulking process, but in the bulking process the treatment must allow the fibers to be separated to form the closed or crunodal loops or slubs to produce the bulked yarn. In addition the surface treatment must allow some integrity between some of the filaments in their new disturbed positions in a bulk yarn to provide tensile strength for the bulked yarn even with the presence of entangled filaments. This integrity must be achieved without using too much of the treating composition which would make it more difficult to cause the slight separation of the filaments to produce the entangled and looped sections of the bulked yarn. The chemical treatment must also provide sufficient integrity between the filaments in the strand or strands to be subjected to the bulking process to allow the strands to be processed through the bulking operation. Also when glass fiber strands from forming packages are to be used as the feed for the bulking operation the chemical treatment on the glass fiber strand must provide cohesion to hold the strands together on the forming packages so as to prevent the formation of knots in the strands when the strands are pulled through the bulking operation. The starch-oil chemical treatments, also referred to as a sizing composition, used in the past do not perform all these functions in a very dependable manner, especially at the small amounts present on the strands to be bulked.

A sizing composition for use with glass fiber strands to be texturized is shown in U.S. Pat. No. 3,971,871 (Haynes et al.). The size utilizes starch materials that are made cationic with a quaternary ammonium radical of a tertiary amine, and a cationic lubricant that is made cationic by a quaternary ammonium radicals practically devoid of primary amines.

It is an object of the present invention to provide an aqueous treating composition for producing treated glass fibers and one or more treated glass fiber strands having better payout or removability from supply packages i.e., forming packages and/or bobbins than strands having a conventional starch-oil sizing composition.

It is an additional object of the present invention to provide an aqueous treating composition for producing treated glass fibers and one or more treated glass fiber strands wherein the treated glass fiber strands have improved bulked tensile strength even with lower amounts of treating composition present on the strands.

It is another object of the present invention to provide an aqueous treating composition for producing treated glass fibers formed into one or more treated glass strands that have improved processability even with smaller diameter fibers.

It is an additional further object of the present invention to provide an aqueous treated composition for producing treating glass fibers, and one or more treated glass fiber strands, wherein the treated glass fiber strand can be processed into bulked yarn at higher processing speeds.

SUMMARY OF THE INVENTION

The foregoing objects and other objects inherent from the following description are accomplished by the use of a modified starch-oil type aqueous treating composition applied to the glass fibers during their formation to produce glass fiber strand. The modified starch-oil type treating composition uses a particular type of starch and the composition is modified with the addition of such ingredients as emulsifiers, starch plasticizers, cationic wetting agents, ester modified amino-silane coupling agents, and may also have friction reducing agents, fluorochemical surfactant, and cationic, nonionic and/or amphoteric surfactants.

The aqueous treating composition also referred to as a sizing composition is comprised of one or more starches having Brabender values equivalent to the following: at around 9.5 percent dry solids, a gel temperature in the range of about 65° C. to about 90° C. and a maximum viscosity in the range of about 500 to about 1200 Brabender Units. The starch or starches are in an amount in the range of about 30 to about 60 weight percent of the nonaqueous components in the sizing composition.

In addition to the starch there is also present a nonionic lubricant in an amount in the range of about 15 to about 36 weight percent based on the non-aqueous components of the sizing composition. Also present are one or more waxes in an amount of about 3 to about 6 weight percent, one or more non-ionic emulsifiers in an amount of about 0.6 to about 1.2 weight percent, a starch plasticizer in an amount of about 3 to about 6 weight percent, a cationic lubricant in an amount of about 7 to about 14 weight percent, and one or more ester modified amino-silane coupling agents in an amount in the range of about 7 to about 15 weight percent. All weight percents are based on the nonaqueous components of the sizing composition.

In addition to the aforementioned ingredient of the aqueous sizing composition, when fine glass filaments having a diameter in the order of about 10 to about $40 \times 10^{-5}$ inches (2.5 microns to 10.2 microns), several additional ingredients are included in the composition. These ingredients added to the aqueous sizing composition include a poly (ethylene oxide) friction reducing agent, a wetting agent, and a fluorochemical surfactant to function as a surface tension reducing agent, where each ingredient is present in an amount greater than zero but less than around 1 weight percent of the nonaqueous components of the sizing composition.

The modified starch is prepared for addition to the aqueous sizing composition by cooking the starch in a jet-type cooker at a temperature of around 235° F. (113° C.) to about 255° F. (124° C.) for a normal jet cooking residence time. Other types of starch cookers can be used at conditions to give an equivalent cooking for the starch.

The aqueous sizing composition is applied to glass fibers having any filament diameter but, when a filament diameter of about 10 to about $40 \times 10^{-5}$ inch is used, the aqueous sizing composition contains the additional forementioned ingredients. The aqueous sizing composition is applied to the glass fibers by any method known to those skilled in the art. The amount of the aqueous sizing composition applied to the glass fibers is that effective amount to give glass fiber strands containing gathered glass fibers having the dried residue of the aqueous sizing composition in an amount based on the total weight of the dried residue and glass fiber strand in the range of about 0.3 to about 0.8 weight percent. The aqueous sizing composition applied to the glass fibers usually has a total solids in the range of about 1.5 to about 4 weight percent.

In addition to the aforementioned ingredients the aqueous sizing composition also has a fungicide and/or bactericide in effective amounts to hinder the growth of fungi and/or bacteria in the sizing composition and sized glass fiber strands.

The delicate balance of the ingredients in the aqueous sizing composition of the present invention produces treated glass fiber strands of the present invention that have enough integrity to be supplied to a bulking yarn operation from packages and especially forming packages with improved pay out, but the composition allows separation of the individual fibers when the treated strand is contacted with a separating force such as an air jet. In addition, when fine diameter glass fibers are used, the dried sizing composition present on the strands with the fine diameter fibers minimizes tension build-up in the fibers and strands during processing. The treated glass fiber strands of any fiber diameter of the present invention are ideally suited for use in preparing bulked glass fiber yarns by any method known to those skilled in the art.

DETAILED DESCRIPTION OF THE INVENTION

The bulked glass fiber strand yarn as used herein refers to bundles of fibers, twisted or untwisted or having a false twist and where the fibers prior to undergoing the bulking operation are generally parallel and densely compacted into a yarn having strands of a fairly average diameter. The bulked glass fiber strand yarn of the present invention encompasses texturized yarns and slubby yarns having uniform or non-uniform, intermittent areas of bulkiness or texturization or convoluted loops. The glass fiber strand yarn used for supplying bulking operation can be any continuous glass fiber strands supplied from bobbins or from forming packages or any other packages known to those skilled in the art. The bulking operation can be any bulking operation known to those skilled in the art, an example of which is shown in U.S. Pat. Nos. 4,003,111 (Drummond) and 3,730,137 (Luscher et al.) both patents are hereby incorporated by reference.

The continuous glass fiber strands present on forming packages used to supply the bulking operation are produced by rapidly attenuating glass fibers from molten streams of glass from small orifices in a bushing. As the glass fibers are being attenuated from the molten streams of glass an aqueous chemical treating composition also referred to in the art as a sizing composition is applied to the glass fibers. The treated glass fibers are then gathered into one or more glass fiber strands and collected by a winder onto a package core. The core and the glass fiber strands wound thereon constitute a forming package which can then be employed in a myriad of further processing steps. Generally before the forming package is employed and any further processing steps it is dried to remove a substantial amount of the moisture present in the treated glass fiber strands. The dried, treated, glass fiber strands in a forming package are glass fiber strands with a dried residue of the aqueous sizing composition that was applied to the glass fibers during forming. One of the processing steps that can be employed with the dried glass fiber strands is to impart a twist to the strands. This is accomplished by placing a plurality of dried forming packages at a plurality of stations on a twist frame machine well known to those skilled in the art. On the twist frame the dried glass fiber strands are removed from the forming package and rewound onto a bobbin. The dried glass fiber strands of the present invention having the dried residue of the aqueous sizing composition of the present invention can be supplied to a bulking operation from either forming packages or bobbins.

The aqueous sizing composition of the present invention permits the sized glass fiber strands to have a sufficient amount of integrity to be supplied to the bulking operation from stable dried forming packages from which the forming tube may or may not have been removed. A sufficient amount of integrity must be provided to enable the strand or strands to be easily removed from strand-containing packages for conveyance into the bulking operation. The amount of strand or strands removed from one or more of the strand-containing packages without breaking is referred to as the payout of the package. While the dried residue of the sizing composition performs this function it also performs another function that is almost diametric to the first function. This function is the dried residue of the sizing composition that permits the sized dried glass fiber strands to come apart to a degree into the individual fibers or filaments, when the strand or strands or yarn are contacted with a separating force, such as a fluid turbulence. This type of separating force is that which is employed in bulking operations to cause the separated fibers to form convoluted loops in and about the yarn, as is well known to those skilled in the art.

The aqueous sizing composition of the present invention has a modified starch material that has a Brabender curve with gel temperatures and peak viscosities as shown above. The modified amylose-containing starch can be derived from any starch sources such as corn, wheat, potato, tapioca, waxy maize, sago, rice, and hybrid starches etc. Conventionally, however, the starch component is derived from either corn starch or a hybrid corn starch. Particularly suitable commercial starches are the Nabond starches available from National Starch and Chemical Company and the Amaizo 310 Starch available from American Maize Products Company. Before the starch is employed in the aqueous sizing composition of the present invention it is cooked to facilitate its suspension into the size. The cooking is accomplished in a jet cooker such as that supplied by National Starch and Chemical Company and the temperature of the cooking is in the range of around 235° F. (113° C.) to around 255° F. (224° C.). The type of starch that is cooked allows for only partial but easy cooking. The modified starches are employed in the aqueous sizing composition in an amount in the range of about 0.7 to about 1.4 weight percent based on the aqueous sizing composition that is comprised of the starch, nonionic lubricant, wax, emulsifiers, starch plasticizer, cationic lubricant, and ester modified amino silane coupling agent. When the aqueous sizing composition also has a poly (ethylene oxide) friction reducing agent, amphoteric wetting agent, surfactant, and fluorochemical surfactant the amount of starch in a sizing composition is in the range of about 0.8 to about 1.2 weight percent of the aqueous composition. Of the solids in the sizing composition the starch is in an amount of about 30 to about 60 weight percent but preferably around 30 to less than 50 weight percent.

The aqueous sizing composition also has a nonionic lubricant or blend of nonionic lubricants which are hydrogenated vegetable oils. A typical hydrogenated vegetable oil would be hydrogenated cottonseed oil, hydrogenated corn oil, hydrogenated soybean oil, glyceroltrioleate and the like. The amount of the nonionic lubricant or lubricants present in the aqueous sizing composition without the additional ingredients is in the range of about 0.3 to about 0.7 weught percent of the aqueous composition. With the inclusion of the additional ingredients for use with fine filament strands the amount of the nonionic lubricant or lubricants in the sizing composition are in the range of about 0.4 to about 0.6 weight percent. On a solids basis the amount of the nonionic lubricant present in the sizing composition is in the broad range of about 15 to about 36 weight percent.

The aqueous sizing composition also has a wax component which can by any suitable wax selected from a group consisting of vegetable waxes, such as carnauba, Japan bayberry, candelilla and the like; animal waxes such as bees wax, Chinese wax, hydrogenated sperm oil wax, and the like; mineral waxes such as ozocerite montan, ceresin and the like; and synthetic waxes such as polyalkylenes like polyethylenes, polyethyleneglycols, polyethylene esters, chlorornaphthalenes, sorbitals, polychlorotrifluoroethylenes; petroleum waxes such as paraffin, microcrystalline waxes and the like. The wax acts as an external lubricant for the glass fibers allowing the glass fibers to endure the abrasion caused by the apparatus employed for the forming, gathering, twisting, and bulking processes without breaking the glass fibers. The amount of the wax in the aqueous sizing composition of the present invention is in the range of about 0.07 to about 0.37 weight percent based on the aqueous sizing composition without the additional ingredients. With the inclusion of the additional ingredients the amount of wax in the aqueous sizing composition is in the range of about 0.08 to about 0.32 weight percent. On a non-aqueous ingredients basis the amount of wax present is the general range of about 3 to about 6 and more specifically in the range of about 3 to less than 5.

The aqueous sizing composition also contains a starch plasticizer to lessen the brittleness of the glass fiber strands. Such a plasticizer useful in the present invention is a polyethylene glycol with an average molecular weight of about 300 available as the "Carbowax ® 300" product. The polyethylene glycol can also be employed in conjunction with a water soluble polyvinyl alcohol in the sizing composition. In place of the low molecular weight polyethylene glycol, glycerine can be employed in a similar weight concentration. The glycerine can be used either alone or in a mixture with polyvinyl alcohol. The amount of the starch plasticizer present in the aqueous sizing composition is in the range of about 0.07 to about 0.14 weight percent, when the aqueous sizing composition does not include the additional ingredients. When the additional ingredients are included the amount of the starch plasticizer is in the range of about 0.085 to about 0.12. On a non-aqueous ingredients basis the amount of starch plasticizer present is generally in the range of about 3 to about 6 and more specifically in a range of about 3 to less than 5.

The emulsifier system used in the sizing composition of the present invention is important because acceptable stability of the sizing composition must be obtained. This is a problem because of the use of the nonionic type lubricant in conjunction with the wax component and the starch component. The nonionic lubricant and the wax are substantially diverse in chemical structure and the emulsifiers used to emulsify the wax are different from those used to emulsify the lubricant. Destabilization might occur when the lubricant is added to an emulsion containing the wax and starch mixture. Thus, the emulsifying system used in the sizing composition of the present invention is of significant importance. A dual emulsifying system is utilized wherein one emulsifier is a sorbitan monostearate and the other emulsifier is polyoxyethylene sorbitan monostearate, wherein one emulsifier has an HLB as low as about 4.5 and the other emulsifiers used in a sizing composition are in amounts sufficient to give an HLB for the emulsifying system of between about 8 and about 12.

Particularly suitable emulsifiers for the sizing composition of the present invention have been found to be the sorbitan monostearate available as "AHCO-909" with and HLB of 4.7 and "AHCO-DFS-149", a polyoxyethylene (20) sorbitan monostearate with an HLB of 14.9. Both of these products are available from ICI Americas, Inc. The amount of the emulsifiers used in the sizing composition are in the range for each of about 0.014 to about 0.026 weight percent of the aqueous sizing with or without additional ingredients, and about 0.6 to about 1.2 on a nonaqueous basis. Although it is preferred that the emulsifier system is comprised of two emulsifiers, as those mentioned above, it is within the scope of the sizing composition of the present invention to have an emulsifier system with more than two emulsifiers so long as the emulsifier system has an HLB in the range of about 8 to about 12. The HLB is an expression well known in the art for the relative simultaneous attraction of an emulsifier for water and for oil or for the two phases of the oil-in-water emulsion system being considered. It appears that HLB is determined by the chemical composition and extent of ionization of a given emulsifier.

The aqueous sizing composition of the present invention also has a cationic lubricant or textile softner to provide a softening action to the sized glass fibers. Typical cationic lubricants or softeners are alkyl imidazoline derivatives such as those described in U.S. Pat. Nos. 2,200,815; 2,267,965; 2,268,273; 2,355,837; which are hereby incorporated by reference. The material designated "Cation-X ®" is an example of such a material wherein the alkyl imidazoline derivative is the reaction product of stearic acid, tetraethylene pentamine and acetic acid. Acid solubilized, water dispersible, stearic amides and anhydrous acid, and solubilized, water dispersible lower molecular weight fatty acid amides as well as anhydrous acid, solubilized polyunsaturated lower molecular weight fatty acid amides can also be used as the cationic lubricants. The amount of the cationic lubricants used in the sizing composition of the present invention is in the range of about 0.14 to about 0.28, when the sizing composition does not contain the additional ingredients, and about 0.16 to about 0.26, when the sizing composition does contain additional ingredients. On a nonaqueous bases the amount of the cationic lubricant is in the range of about 7 to about 14 more specifically about 7 to about 12.

The aqueous sizing composition of the present invention also contains a particular type of silane coupling agent which gives good processability in applying the aqueous sizing composition to glass fibers and which gives the sized glass fiber strands good textile handling characteristics. This silane coupling agent is an ester modified amino silane coupling agent. The ester modified amino silane coupling agents include the silane and siloxane materials, for example, hydrolyzable ester modified amino silane coupling agent, their hydrolysis products and polymers of the hydrolysis products. The ester-modified amino silane coupling agent can be based on any amino silane coupling agent known to those skilled in the art. These amino functional silane coupling agents range in composition from the single primary amino group, gamma-amino-propyltriethoxysilane, to the primary-secondary, diamino functional silane, N-beta(aminoethyl) gamma-aminopropyltrimethoxysilane, and the polyamino functional silanes. The base amino functional silane is modified with an ester that has carbon groups having one to six carbon atoms in each of the carbon containing groups of the ester. A particularly suitable ester-modified amino functional silane useful in the sizing composition of the present invention is methyl [2-(gamma trimethoxysilylpropylamino) ethyl-amino] [3-propionate] available in a methanol solution from Union Carbide Corporation under the trade designation "A-1125" or from Dow Corning under the trade designation "C-600". This ester-modified amino silane has a molecular weight of around 296.5 and an apparant specific gravity at 25° C. of 0.889. The amount of the ester-modified amino functional silane coupling agent used in the sizing composition of the present invention is in a range based on weight percent of the aqueous composition from about 0.18 to about 0.33, when the aqueous sizing composition does not have the additional ingredients for use with fine glass fibers. When the aqueous sizing composition does contain the additional ingredients for fine diameter glass fibers the amount of the silane coupling agent is in the range of about 0.2 to about 0.3 weight percent. The amount of silane coupling agent used on a non-aqueous basis is in the range of about 7 to about 15 weight percent for the A-1125 product which has an active solids of 70% in methanol. The ester-modified silane coupling agent can have a different percentage of active solids and can also be used in solvents other than methanol such as ethanol, benzene, methylcellosolve and water.

The aqueous sizing composition of the present invention also has a small amount of fungicide and/or bactericide to deter the growth of fungi and/or bacteria in the sizing composition due to the presence of the starch. Any fungicide or bactericide known to those skilled in the art may be used, such as, one of the organo-metalic quaternary type fungicides for example, tributyltinoxide. The fungicide is employed in sufficient amounts to prevent mold attack or growth on the amylose containing starch derivative. Suitable effective amounts of the fungicide are those equivalent to about 3 milliliters for every 75 gallons of the sizing composition. The amount of fungicide can be varied depending on the amount of starch used in the aqueous sizing composition to function effectively as a mold and fungi suppressant. When the aqueous sizing composition of the present invention is to be used to treat fine glass fibers having a diameter in the order of about 10 to about $40 \times 10^{-5}$ inches (about 2.5 to about 10.2 microns), additional ingredients must be added to the aqueous sizing composition to provide adequate processability and tension and drag reducing characteristics to protect the finer diameter glass fibers from damage during processing and bulking operations.

One such additional ingredient is a poly (ethylene oxide) friction reducing polymeric agent. Friction or drag reducing agents are polymeric solutes used in small quantities to reduce the friction factor with only slightly greater increases in solution viscosity. Particularly suitable poly (ethylene oxide) polymeric friction reducing agents useful in the aqueous sizing composition in the present invention for fine diameter glass fibers are marketed under the trade designation "Polyox water soluble resins" by Union Carbide Corporation. The approximate molecular weight of the poly (ethylene oxide) polymer is in the range of about 600,000 to about 5,000,000. The "polyox" products that are suitable range from the product designation WSR, N-205 to N-301 with the 301 product being particularly suitable. The amount of the poly (ethylene oxide) friction reducing agent used in the aqueous sizing composition in the present invention is generally less than 1 weight percent of the nonaqueous components of the size and preferable in the range to about 0.14 to about 0.26 weight percent of the nonaqueous components and about 0.004 to about 0.006 of the aqueous size.

Another additional ingredient that is used in the aqueous sizing composition of the present invention for treating fine diameter glass fibers is an amphoteric, nonionic or cationic surfactant that has good solubility in aqueous solutions and functions as a wetting agent. A particularly suitable amphoteric surface-active agent is the product marketed under the trade designation "Triton ® QS-15" agent available from Rohm and Haas Company and other similar oxyethylated sodium salts containing both anionic and cationic sites. The amount of the surface active wetting agent used in the aqueous sizing composition of the present invention is in the range of about 0.07 to about 0.13 weight perent of the non-aqueous components in the sizing composition and about 0.001 to about 0.005 weight percent of the aqueous sizing composition.

Another additional ingredient that is useful in the sizing composition of the present invention for treating fine diameter glass fibers is a fluorochemical surfactant that can be anionic, cationic, nonionic, or amphoteric. The fluorochemical compound can be any fluoro surfactant having the fluorocarbon chain. An example of such a fluorocarbon chain is $[F_3CCF_2CF_2]$. A particular useful fluorochemical surfactant is available under the trade designation "Zonyl FSA" or "Zonyl FSC" or "Zonyl FSN" available from E. I. DuPont deNemours and Company, Inc. and the product under the trade designation "Flourad 171" from 3M Company, Minnesota. The amount of the fluorchemical surfactant used in the aqueous sizing composition of the present invention is in the range of about 0.001 to about 0.005 weight percent of the aqueous sizing composition and on a non-aqueous component basis in the range of about 0.07 to about 0.13.

The solids content of the aqueous sizing composition is generally in the range of about 1.5 weight percent to about 4 weight percent and preferably in the range of about 1.5 to about 2.1 weight percent. If the solids content goes much above 4 weight percent, the dried residue of the aqueous sizing composition on the glass fiber strands will be too thick and will thereby reduce the benefits achieved by the use of the aqueous sizing composition and sized glass fiber strands of the present invention. In addition to the aforementioned ingredients of the aqueous sizing composition there is present the desired amount of water to give the percent solids in the aforementioned range of about 1.5 to about 4 weight percent.

The aqueous sizing composition of the present invention can be prepared by any method known to those skilled in the art of preparing stable sizing compositions of the starch-oil type. The aqueous sizing composition can then be applied to glass fibers formed from any fiberizing glass composition known to those skilled in the art e.g. E-Glass and 621-glass and low pollution derivatives thereof. The manner of applying the sizing composition to the glass fibers may be accomplished by any method known to those skilled in the art during the formation of the glass fibers. The sized glass fibers are then gathered into glass fiber strands and wound into packages and dried to remove most of the moisture. The dried glass fiber strands are then ready for use in a bulking operation.

PREFERRED EMBODIMENT

The aqueous sizing composition for use with medium diameter glass fibers preferably has the following formulation:

| Material | Weight Percent on a Nonaqueous Basis | Weight Percent on the Aqueous Sizing Composition |
|---|---|---|
| Modified Starch (Nabond or Amaizo 310) | about 30 to about 50 | about 0.9 to about 1.2 |
| Hydrogenated Soybean Oil | about 15 to about 30 | about 0.4 to about 0.6 |
| Paraffin Wax | about 3 to less than 5 | about 0.08 to about 0.12 |
| Sorbitan Monostearate (Emulsifier) AHCO-909 | about 0.6 to about 1.2 | about .017 to about 0.23 |
| Polyoxyethylene (20) Sorbitan Monostearate (AHCO-DFS-149) | about 0.6 to about 1.2 | about .017 to about 0.23 |
| Glycerine (Starch Plasticizer) | about 3 to about 6 | about .08 to about 0.12 |
| Alkyl Imidazoline (Cation-X) | about 9 to about 14 | about 0.16 to about 0.27 |
| Ester Modified Amino Silane Coupling Agent (A-1125) | about 7 to about 15 | about 0.2 to about 0.3 |

The aqueous sizing composition was prepared by cooking the starch to a temperature of about 245° F. (118° C.) in a jet cooker available from National Starch and Chemical Corp. The glycerine and the ester modified amino silane coupling agent are added directly to a main mix tank.

In a separate mixing vessel, the emulsifying agent sorbitan monostearate and polyoxyethylene (20) sorbitan monostearate were added to the molten paraffin wax and the nonionic lubricant at a temperature of about 170° F. (77° C.) to about 180° F. (about 82° C.) and these materials were mixed in an Eppenbach homogenizer while water at 170° (77° C.) to 180° F. (82° C.) was slowly added until the mixture passed through its inversion point and became an emulsified mixture of oil-in-water. This homogenized mixture was then added to the starch in a main mix vessel along with the addition of the cationic lubricant (Cation X) which was previously mixed with hot water. Also there was added an amount of methyl [2 gamma-trimethoxysilpropylamino] [3 propionate] in methanol (A-1125) that had been hydrolyzed with about 2.5 milliliters of acetic acid and water solution. The glycerine was added directly to the main mix tank containing the other ingredients. The Biomet 66 fungicide was dispersed in water and added to the mixture of starch and emulsion and Cation X lubricant, coupling agent glycerine. The sizing composition is completed by diluting the mixture in the main mix tank to the desired volume with water. During the entire procedure of forming the aqueous sizing composition agitation is employed to effect homogeneous mixture.

In an alternative embodiment an aqueous sizing composition is prepared for use in treating fine glass fibers by preparing the starch in a jet cooker in a similar manner as that aforedescribed and also preparing the emulsion of the nonionic lubricant with the emulsifiers and the paraffin wax in a similar manner to that described above and then the glycerine, fluorochemical surfactant and methyl (gamma-trimethoxysilyproplamino) (ethylamino) [3-propionate] in a methanol (A-1125) is added directly to the main mix tank containing the starch, the emulsions of the nonionic lubricant, paraffin wax, and emulsifiers. The amphoteric wetting agent, oxyethylated sodium salt (Triton Q S-15), is dissolved in about 10 times its weight in warm water and added to the main mix tank containing the starch, the emulsion, glycerine, fluorochemical surfactant (Zonyl FSN surfactant) and silane coupling agent. The poly (ethyleneoxide) Polyox (WSR 301) is sifted into well agitated hot water in an amount of about 10 times the weight of the poly (ethylene oxide) with agitation continued while an equal quantity of room temperature water is added and the mixture is added to the ingredients of the main mix tank. Alternatively the poly (ethylene oxide) can be sifted directly into the main mix tank. The aqueous sizing composition is completed by diluting the mixture to the desired total volume with water. During the entire procedure for combining the above ingredients, agitation is employed to effect a homogeneous mixture.

The preferred sizing composition and the alternative embodiment sizing composition are used to treat strands with medium diameter glass fibers such as known as E fibers through K fibers having filament diameters from about $25 \times 10^{-5}$ inches to about $50 \times 10^{-5}$ inches in any conventional manner. (Also the alternative embodiment size is used to treat $10 \times 10^{-5}$ to about $40 \times 10^{-5}$ inches) in a conventional manner. The sizing composition can be applied to the fibers prior to the time they are gathered together to form a strand containing myriad fibers, generally on the order of 200 or more by means of a roller applicator which is partially submerged into the sizing composition contained in a reservoir. Such an applicator is shown in more detail in U.S. Pat. No. 2,728,972 hereby incorporated by reference. Also any applicator known to those skilled in the art for applying aqueous sizing composition to glass fibers can be used. The fibers are gathered into strands by a gathering shoe and wound onto a forming package rotating generally at an RPM of 4,000 to 5,000 and higher depending on winder capability on the order of around 14,000 feet per minute. Any other methods of applying the sizing composition to the strands of glass fibers, such as a pad applicator, may be employed and a strand may be formed by means other than winding on the forming tubes such as by a means of a pair of rotating wheel pullers which direct fibers into a suitable collecting device. The glass fiber strands wound on a forming package are then dried in an oven or allowed to air-dry. The dried glass fiber strands have an amount of the dried residue of the aqueous sizing composition in a range of about 0.3 to about 0.8 percent LOI. The percent LOI is a measurement of the dried sizing material in a percentage based on the weight of the glass plus the sizing. The forming package of the glass fiber strand or strands can be used directly in a bulking operation to produce bulked glass fiber strand yarn.

Alternatively the glass fiber strand or strands present in a forming package can be placed on a bobbin for use in a bulking operation. The glass fiber strand from a forming package is placed on a bobbin by unwinding strands from a plurality of forming packages on a twist frame onto bobbins. During the unwinding and rewinding step, a twist is imparted into the strand which provides integrity for subsequent processing.

The dried glass fiber strand preferably from forming packages can be bulked by any method of bulking glass fiber strands to produce yarn that has convoluted loops or slubs, but it is preferred to produce texturized glass fiber yarn. The texturized glass fiber yarn can be one strand or a multitude of strands comprising the yarn. One method of preparing the texturized glass fiber strand yarn can be that shown in U.S. Pat. No. 4,003,111 (Drummond) which is hereby incorporated by reference. It is preferred to produce the texturized glass fiber yarn by passing the yarn composed of one or more strands through a needle venturi type air jet.

To further illustrate the aqueous sizing composition and the sized glass fiber strands and bulked glass fiber strand yarn of the present invention reference should be made to the following examples.

EXAMPLE 1

An aqueous sizing composition was prepared in the manner described in the preferred embodiment having the following formulation:

| Ingredient | Amount in Grams |
|---|---|
| Starch (Nabond) [Partially cooked at 245° F.] (118° C.) | 400 |
| Soybean Oil | 200 |
| Paraffin Wax | 40 |
| Emulsifier [AHCO-909] | 8 |
| Emulsifier [AHCO-DFS-149] | 8 |
| Glycerine 99 | 40 |
| Cationic Lubricant (Cation-X) | 90 |
| Ester-Modified Amino Silane Coupling Agent (A-1125) | 100 |
| Poly (ethylene oxide) [Polyox WSR 301] | 2 |
| Amphoteric Surfactant (Triton QS-15) | 1 |
| Fluorochemical Compound (Fluorad 171 Fluorocarbon polymer 505 aqueous solution) | 2 |
| Water sufficient to dilute 10 gallons 37.85 liters | |

The solids content of the sizing composition was 1.93% with a pH of 8.3 and a viscosity of 8.0 centipoise.

The aqueous sizing composition was used to treat glass fiber strands having a filament diameter of around $25 \times 10^{-5}$ inch. Dried glass fiber strand having a dried residue of the aqueous sizing composition were used to produce multiple strand bulked glass fiber strand yarn.

The aqueous sizing composition was also used to prepare a single strand yarn were the fiber diameter was $25 \times 10^{-5}$ inch and another single strand bulked yarn where the fiber diameter of the fibers in the strand was 35 to $40 \times 10^{-5}$ inch. In making a single strand texturized yarn with the fiber diameter of $25 \times 10^{-5}$ inch the texturizing was accomplished with an air flow in SCFM of 3, an air pressure of 64 PSI with an air jet needle of 0.040, and an air jet venturi of 0.056, and a percent of overfeed 9.8 for the rate of yarn feed compared to the rate of yarn withdraw.

The multistrand texturized glass fiber yarn was prepared from forming packages of the glass fiber strand with the dried residue, where the aqueous sizing composition and the single strand glass fiber texturized yarn was prepared from bobbins of glass fiber strand having the dried residue of the aqueous sizing composition. The percent LOI on the strand was 0.45.

EXAMPLE 2

An aqueous sizing composition was prepared by the method described in the preferred embodiment having the following formulation:

| Ingredient | Amount on a Basis of a 1,000 Gallon Mix | Weight Percent on Aqueous Basis |
|---|---|---|
| Starch (Nabond) | 88.1 lbs. | 1.056 |
| Soybean Oil | 44.1 lbs. | 0.53 |
| Paraffin Wax | 8.8 lbs. (3.99 kg) | 0.105 |
| Emulsifier ACHO-909 | 800 grams | 0.02 |
| Glycerine | 8.8 lbs. (3.99 kg) | 0.105 |
| Cationic Lubricant (Cation-X) | 19.8 lbs. (8.99 kg) | 0.24 |
| Ester Modifier Amino Silane (A-1125) | 22.0 lbs. (9.98 kg) | 0.326 |
| Poly (ethylene oxide) Polyox WSR 301 | 200 grams | 0.005 |
| Amphoteric Surfactant (Triton QS-15) | 100 grams | 0.003 |
| Fluorochemical Compound (Zonyl FSN Fluorocarbon Surfactant) | 200 grams | 0.003 |
| Fungicide Biomet 66 | 38 Milliliters | |
| Metered water for starch | 188 Gallons | |

The sizing composition prepared from the foregoing formulation had a solids content of $1.82 +/- 0.15\%$ and a pH of $8.0 +/- 0.5$. The viscosity of the sizing composition was $7.5 +/- 2.0$ centipoise.

The foregoing aqueous sizing composition was used to prepared glass fiber strand having the dried residue of the aqueous sizing composition which was then used to prepare bulked glass fiber strand yarn of the single strand and multistrand variety. These preparations were the same as those for the aqueous sizing composition of Example 1.

Glass fiber strands with the dried residue of the aqueous sizing composition of Example 2 were used to produce the single strand and the multistrand texturized glass fiber strand yarns which were tested against texturized yarns made with glass fiber strands having dried residue of a starch-oil sizing composition like that shown in U.S. Pat. Nos. 3,167,468 or 3,227,192. The yarn made with the aqueous sizing composition of the present invention was produced from forming packages giving good payout i.e. the strand removability for processing through the bulking operation. The results of the comparison are shown in Table 1 below.

TABLE I

| Samples of | Type of Texturized Yarn | Filament Diameter X10$^{-5}$ Inches | Supply Package | Breaking or Tensile Strength (Newtons) | Binder Appl. | Speed of Texturizing Yards/Min. |
|---|---|---|---|---|---|---|
| Glass fiber strands with dried residue of sizing composition | | | | | | |
| A. Conventional Starch-oil | 1. Single Strand | 35-40 | | 361.2 | | |
| | 2. Multistrand 3.5 | 35-40 | forming pkg. | 35 lbs. | 3.5+/−0.7 | 337+/−17 |
| | 3. Multistrand 5.0 | 35-40 | forming pkg. | 25 lbs. | 3.5+/−0.7 | 570+/−29 |
| B. Sizing Composition of Example I | 1. Single Strand | 20-30 | Bobbin | .05 lbs. | | 1,000 Y/Min. |
| | 2. Single Strand | 35-40 | | 398 | | |
| | 3. Multistrand 3.5 | 35-40 | forming pkg. | 37 lbs. | 1.32 | 750 |
| | 4. Multistrand 5.0 | 35-40 | forming pkg. | 35 | 1.48 | 1,200 |
| | 5. Multistrand 11.6 | 20-30 | bobbin 10,10,11,15 oz. | 24.6 lbs. | 0.59 | 600 |
| | 6. Multistrand 11.8 | 15-20 | bobbin .10 lbs. | 29.5 | 1.20 | 488 |

The foregoing has described an aqueous sizing composition and sized glass fiber strand and bulked yarn having one or more of each of the following components:

(1) specific type of starch
(2) lubricant
(3) emulsifiers
(4) starch plasticizers
(5) cationic wetting agents
(6) ester modified amino-silane coupling agents, and may also have one or more of each of:
(7) friction reducing agents
(8) fluorochemical surfactant and
(9) nonionic, cationic and/or amphoteric surfactant The use of the aqueous sizing composition allows the production of bulked glass fiber strand yarn from forming packages or bobbins of glass fiber strands with more facile processability. Also the yarn produced has better tensile properties even with lower amounts of the dried residue of the sizing composition present on the strands.

Table II presents a comparison of payout performance of glass fiber strands treated with the aqueous sizing composition of Example 2 versus glass fiber strands treated with aqueous starch-oil sizing compositions of U.S. Pat. No. 3,167,468 (Strand A) and U.S. Pat. No. 4,197,349 (Strand B).

TABLE II

| Texturized Multi-strand Glass Fiber Yarn filament diameter/ yardage 10-5 inches | Weight of Full Texturized Yarn Package (lbs) | Average Weight in lbs of Texturized Yarn Package of A Strands | Average Weight in lbs of Texturized Yarn Package of B Strands | Average Weight in lbs of Texturized Yarn Package of Strands with dried Example 2 Sizing |
|---|---|---|---|---|
| 25 ± 2.5/6.0 | 25 | 14.5 | — | 23 |
| 25 ± 2.5/11.6 | 25 | 10.3 | — | 23 |
| 37.5 ± 2.5/3.5 | 25 | — | 16.8 | 22 |
| 37.5 ± 2.5/5.0 | 27 | — | 15.8 | 20 |

From Table II, it is apparent that the texturized yarn product having strands containing the dried residue of the aqueous size of the present invention is processed into almost full packages. The texturized yarn products having A or B strands were not processed into packages as full as the packages with the texturized yarn of the present invention. One reason for this is that strands of the present invention paid-out better from their packages into the texturizing operation.

I claim:

1. An aqueous bulking sizing composition for treating glass fibers during their formation to protect the fibers against interfilament abrasion when fibers are gathered into strands, to allow for facile removal of the strand or strands from supply packages to a bulking operation and to allow the fibers within the strand to become separated to a degree, when the strand or strands are subjected to the separating force of the bulking operation, comprising:
a. starch having Brabender values equivalent to gel temperature in the range of about 65° C. to about 90° C. and maximum viscosity in the range of about 500 B.U. to about 1200 B.U. at a 9.5 dry solids percent concentration in an amount in the range of about 30 to about 60 weight percent of the nonaqueous components of the composition;
b. hydrogenated nonionic lubricant in the amount in the range of about 15 to about 36 weight percent of the nonaqueous components;
c. one or more waxes in an amount of about 3 to about 6 weight percent of the nonaqueous components,
d. one or more nonionic emulsifiers giving a total HLB in the range of about 8 to about 12 for emulsification of the nonionic lubricant;
e. a starch plasticizer in the amount of about 3 to about 6 weight percent of the nonaqueous components;
f. a cationic lubricant in the amount of about 7 to about 14 weight percent of the nonaqueous components;
g. one or more ester modified amino silane coupling agents in an amount of about 7 to about 15 weight percent of the nonaqueous components, and
h. an amount of water sufficient to yield a total solids for the composition in the range of about 1.5 to about 4 weight percent of the aqueous composition.

2. The aqueous treating composition of claim 1 which in addition has:
a. poly(ethylene oxide) friction reducing polymeric agent in the amount less than around 1 weight percent of the non-aqueous components of the sizing composition;
b. amphoteric, cationic, and/or nonionic surfactant in an amount less than 1 weight percent of the non-aqueous components of the composition; and
c. a fluorochemical surfactant in an amount less than one weight percent of the non-aqueous components of the sizing composition.

3. Aqueous treating composition of claim 1 or 2 wherein the starch is partially cooked at a temperature of about 235° F. (113° C.) to about 255° F. (124° C.) in a jet cooker.

4. Aqueous treating composition of claim 1 or claim 2 wherein the starch has Brabender values at 9.5 percent solids concentration or equivalent of gel point in the range of about 86° C. to 89° C. with about maximum viscosity in the range of about 500 B.U. to about 750 B.U.

5. Aqueous treating composition of claim 1 or claim 2 wherein the starch has Brabender values at 9.5 percent solids concentration or equivalent of gel point in the range of about 68° C. to about 74° C. with corresponding maximum viscosities in the range of about 800 to about 1200 B.U.

6. Aqueous treating composition of claim 1 or 2 wherein the hydrogenated nonionic lubricant is a partially or fully hydrogenated vegetable oil.

7. Aqueous treating composition of claim 1 or 2 wherein the cationic lubricant is an alkyl substituted imidazoline derivative.

8. Aqueous treating composition of claim 1 or claim 2 wherein the amount of one or more nonionic emulsifiers is in the range of about 0.6 to about 1.2 weight percent of the nonaqueous components of the treating composition.

9. Aqueous treating composition of claim 1 or claim 2 wherein the wax is paraffin wax.

10. Aqueous treating composition of claim 1 or claim 2 wherein the starch plasticizer is glycerine.

11. Aqueous treating composition of claim 1 or claim 2 wherein the ester modified amino-silane is methyl [2-(gamma-trimethoxysily-propyl amino) ethyl-amino] 3-propionate in methanol solvent.

12. Aqueous treating composition of claim 1 or claim 2 having an effective amount of fungicide or biocide.

13. Aqueous treating solution of claim 2 wherein the poly(ethylene oxide) polymer has a molecular weight of around 4,000,000 and is present in an amount of about 0.14 to about 0.26 weight percent of the non-aqueous components of the composition.

14. Aqueous treating solution of claim 2 wherein the cationic, amphoteric and/or nonionic surfactant is a liquid amphoteric, oxyethylated sodium salt present in an amount in the range of about 0.07 to about 0.13 weight percent of the non-aqueous components of the treating composition.

15. Aqueous treating solution of claim 2 wherein the fluorochemical surfactant is present in an amount of about 0.07 to about 0.13 weight percent based on the nonaqueous components of the composition.

16. Glass fiber strand or strands having the dried residue of the aqueous sizing composition of claim 1 or 2.

17. Glass fiber strand or strands of claim 1 or 2 having an amount of the dried residue in the range of about 0.3 to about 0.8 weight percent of the strand plus the coating.

18. Glass fiber strand or strands having the dried residue of the aqueous sizing composition of claim 2 wherein the strand is comprised of glass fiber filaments having a filament diameter in the range of about $10 \times 10^{-5}$ inches to about $40 \times 10^{-5}$ inches.

19. Bulked glass fiber strand yarn produced from one or more glass fiber strands having a dried residue of an aqueous treating composition, comprising:
a. starch having Brabender values equivalent to gel temperature in the range of about 65° C. to about 90° C. and maximum viscosity in the range of about 500 B.U. to about 1200 B.U. at a 9.5 dry solids percent concentration in an amount in the range of about 30 to about 60 weight percent of the nonaqueous components of the composition;
b. hydrogenated nonionic lubricant in the amount in the range of about 15 to about 36 weight percent of the nonaqueous components;
c. one or more waxes in an amount of about 3 to about 6 weight percent of the nonaqueous components;
d. one or more nonionic emulsifiers giving a total HLB in the range of about 8 to about 12 for emulsification of the nonionic lubricant;
e. a starch plasticizer in the amount of about 3 to about 6 weight percent of the nonaqueous components;
f. a cationic lubricant in the amount of about 7 to about 14 weight percent of the nonaqueous components;
g. one or more ester modified amino silane coupling agents in an amount of about 7 to about 15 weight percent of the nonaqueous components, and
h. an amount of water sufficient to yield a total solids for the composition in the range of about 1.5 to about 4 weight percent of the aqueous composition.

20. Bulked glass fiber strand yarn of claim 19 produced from one or more glass fiber strands supplied to the bulking operation from one or more forming packages.

21. Bulked glass fiber strand yarn of claim 16 wherein one or more glass fiber strands used to produce the bulked glass fiber strand yarn is supplied from one or more bobbin.

22. Bulked glass fiber yarn of claim 19 wherein the bulking is texturizing accomplished with the use of an air jet.

23. Bulked glass fiber strand yarn of claim 16, wherein the aqueous treating composition has present:
a. poly(ethylene oxide) friction reducing polymeric agent in the amount less than around 1 weight percent of the nonaqueous components of the sizing composition;
b. amphoteric, cationic, and/or nonionic surfactant in an amount less than 1 weight percent of the nonaqueous components of the composition; and
c. a fluorochemical surfactant in an amount less than one weight percent of the nonaqueous components of the sizing composition.

24. Bulked glass fiber strand yarn of claim 23, wherein the glass fiber strand or strands having the dried residue of the aqueous sizing composition are comprised of glass fiber filaments having a fiber diameter in the range of about $10 \times 10^{-5}$ inch to about $40 \times 10^{-5}$ inch.

25. Bulked glass fiber yarn of claim 24, wherein the aqueous treating solution of the poly(ethylene oxide) polymer has a molecular weight of around 4,000,000 and is present in an amount of about 0.14 to about 0.26 weight percent of the nonaqueous components of the composition.

26. Bulked glass fiber yarn of claim 24, wherein in the aqueous treating solution, the cationic, amphoteric and/or nonionic surfactant is a liquid amphoteric, oxyethylated sodium salt present in an amount in the range of about 0.07 to about 0.13 weight percent of the nonaqueous components of the treating composition.

27. Bulked glass fiber yarn of claim 24, wherein in the aqueous treating solution the fluorochemical surfactant is present in an amount of about 0.07 to about 0.13 weight percent based on the nonaqueous components of the composition.

* * * * *

UNITED STATES PATENT AND TRADEMARK OFFICE
CERTIFICATE OF CORRECTION

PATENT NO. : 4,397,913
DATED : August 9, 1983
INVENTOR(S) : Dennis M. Fahey

It is certified that error appears in the above-identified patent and that said Letters Patent is hereby corrected as shown below:

Column 17, line 33, delete the term "amout" and insert therefor --amount--.

Signed and Sealed this

Twenty-seventh Day of December 1983

[SEAL]

Attest:

GERALD J. MOSSINGHOFF

Attesting Officer

Commissioner of Patents and Trademarks